US012225056B2

(12) United States Patent
Kirner et al.

(10) Patent No.: US 12,225,056 B2
(45) Date of Patent: *Feb. 11, 2025

(54) CORE SERVICES DETECTION FOR A SEGMENTED NETWORK ENVIRONMENT

(71) Applicant: Illumio, Inc., Sunnyvale, CA (US)

(72) Inventors: Paul James Kirner, Palo Alto, CA (US); Pallavi Tyagi, Sunnyvale, CA (US)

(73) Assignee: Illumio, Inc., Sunnyvale, CA (US)

( * ) Notice: Subject to any disclaimer, the term of this patent is extended or adjusted under 35 U.S.C. 154(b) by 9 days.

This patent is subject to a terminal disclaimer.

(21) Appl. No.: 18/204,038

(22) Filed: May 31, 2023

(65) Prior Publication Data

US 2023/0308488 A1     Sep. 28, 2023

Related U.S. Application Data

(63) Continuation of application No. 17/015,020, filed on Sep. 8, 2020, now Pat. No. 11,706,258.

(60) Provisional application No. 62/899,726, filed on Sep. 12, 2019.

(51) Int. Cl.
*H04L 9/40*     (2022.01)
*G06N 20/00*    (2019.01)

(52) U.S. Cl.
CPC ............. *H04L 63/20* (2013.01); *G06N 20/00* (2019.01)

(58) Field of Classification Search
CPC .............................. H04L 63/20; G06N 20/00
See application file for complete search history.

(56) References Cited

U.S. PATENT DOCUMENTS

2018/0234459 A1     8/2018  Kung et al.
2020/0296139 A1     9/2020  Fainberg et al.
2021/0336899 A1*   10/2021  Tiagi ................. H04L 47/781

OTHER PUBLICATIONS

United States Office Action, U.S. Appl. No. 17/015,020, filed Oct. 6, 2022, 6 pages.

* cited by examiner

*Primary Examiner* — Hee K Song
(74) *Attorney, Agent, or Firm* — Fenwick & West LLP (57)     ABSTRACT

A segmentation server updates enforcement of a segmentation policy based on detection of core services. The segmentation server obtains characteristics of workloads and identifies workloads that provide core services using port matching, supervised learning based classification, semi supervised learning based classification, or a combination thereof. The segmentations server applies labels to workloads identified as core service providers indicative of the detection. Rules of the segmentation are distributed to enforcement modules based on the label sets of associated workloads to enable the enforcement modules to enforce the segmentation policy. Detection of core services reduces the likelihood of administrator inadvertently enforcing a policy that blocks essential core services.

20 Claims, 5 Drawing Sheets

CORE SERVICES DETECTION FOR A SEGMENTED NETWORK ENVIRONMENT

CROSS-REFERENCE TO RELATED APPLICATIONS

This application is a continuation of U.S. patent application Ser. No. 17/015,020, filed one Sep. 8, 2020, which claims the benefit of U.S. Provisional Application No. 62/899,726 filed on Sep. 12, 2019, both of which are incorporated by reference.

BACKGROUND

A segmentation policy comprises a set of rules that control which workloads may communicate on a network and may place restrictions on how such workloads may communicate. While a well configured segmentation policy can significantly enhance security, a poorly configured segmentation policy may inadvertently block access to core services that are essential to operation of applications in a data center. Therefore, it is important to identify and develop a segmentation policy that enables these core services.

SUMMARY

A segmentation server updates enforcement of a segmentation policy based on detection of core services. The segmentation server receives a set of workload characteristics associated with a workload executing on a host device. The segmentation server generates based on the set of workload characteristics, a feature vector representing the set of workload characteristics. The segmentation server detects whether the workload provides a core service. The detection may be based at least in part on applying a classification model to the feature vector to determine a class of the workload that indicates whether the workload provides a core service. Detection may furthermore be based on port matching or a combination of techniques. Responsive to detecting that the workload provides the core service, the segmentation server assigns a label to the workload indicative of the workload providing the core service. The segmentation server then determines based on a segmentation policy, a set of segmentation rules applicable to the workload based in part on the label indicative of the workload providing the core service. The segmentation server sends the set of rules to an enforcement module associated with the host device to enable the enforcement module to enforce the set of segmentation rules applicable to the workload.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

A segmentation server updates enforcement of a segmentation policy based on detection of core services. The segmentation server 120 obtains characteristics of workloads and identifies workloads that provide core services using port matching, supervised learning based classification, semi supervised learning based classification, or a combination thereof. The segmentations server applies labels to workloads identified as core service providers indicative of the detection. Rules of the segmentation are distributed to enforcement modules based on the label sets of associated workloads to enable the enforcement modules to enforce the segmentation policy. Detection of core services reduces the likelihood of administrator inadvertently enforcing a policy that blocks essential core services.

Figure 1:
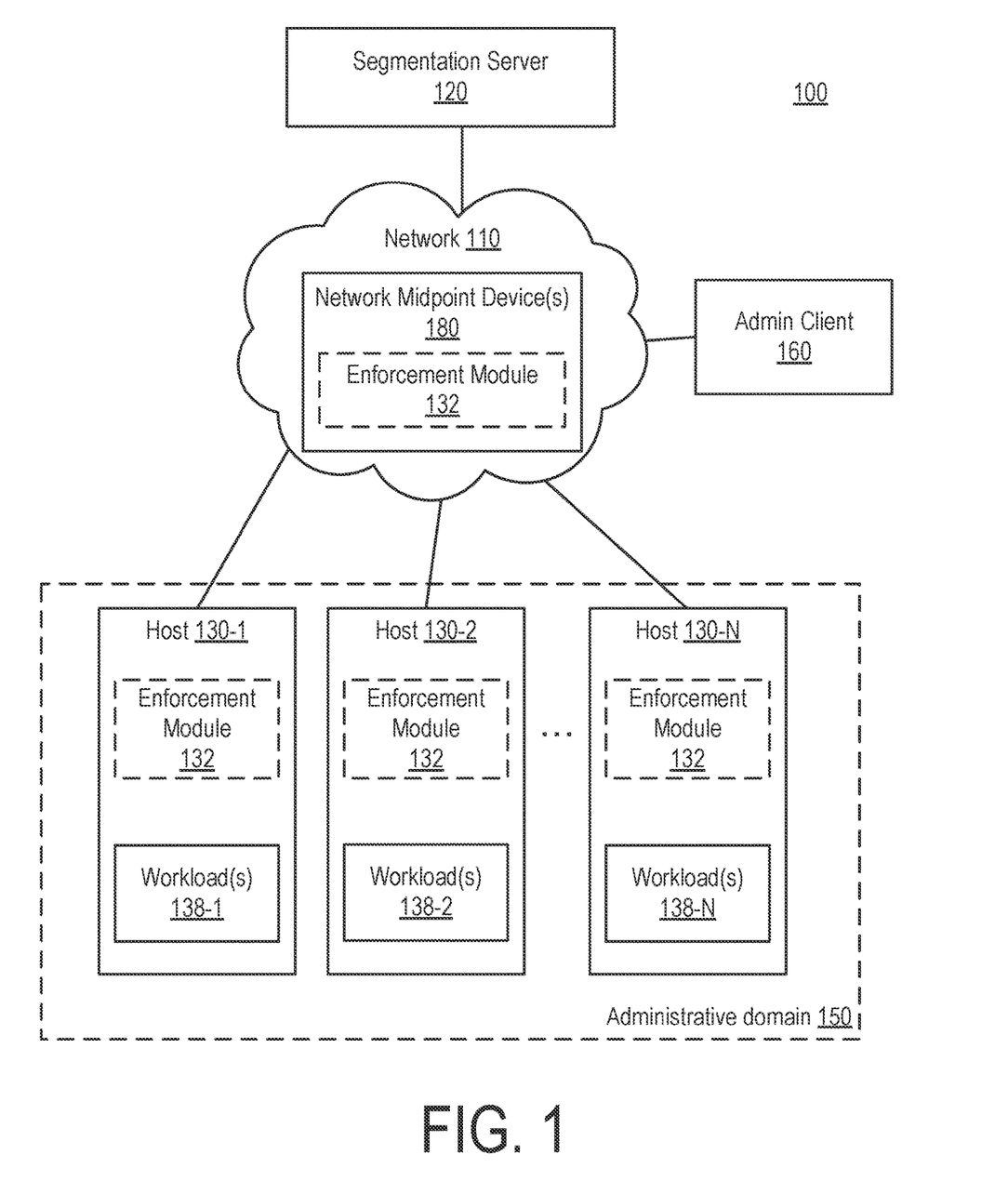
FIG. 1 is a high-level block diagram illustrating an environment for managing a segmentation policy, according to one embodiment.

FIG. 1 is a high-level block diagram illustrating a networked computing environment 100. The networked computing environment 100 includes a segmentation server 120, a network 110 including one or more network midpoint devices 180, an administrative client 160, and an administrative domain 150 that includes a plurality of hosts 130 (e.g., hosts 130-1, 130-2, . . . , 130-N). The administrative domain 150 can correspond to a set of devices controlled by an enterprise such as, for example, a service provider, a corporation, a university, or a government agency.

The hosts 130 may each comprise a physical host device, a virtual machine executing on computer system, or an operating system instance executing on a physical host device or virtual machine capable of hosting one or more workloads 138. A single physical or virtual machine may operate a single host 130 or may operate multiple hosts 130. The hosts 130 each execute one or more workloads 138 (e.g., one or more workloads 138-1, one or more workloads 138-2, etc.). The workloads 138 comprise independently addressable computing units for performing computing tasks. A workload 138 may comprise, for example, an application or application component, a process, a container, an operating system instance, or other sub-component thereof executing on the host 130. In some instances, a host 130 may operate only a single workload 138. In other instances, a host 130 may operate multiple workloads 138 (e.g., multiple containers) that may be independently addressable and may execute different applications or otherwise perform different independent computing functions. In some embodiments, multiple workloads 138 may operate collectively to execute an application. The workloads 138 on the hosts 130 may communicate with other workloads 138 on different hosts 130 within the administrative domain 150 to perform various tasks.

The network 110 represents the communication pathways between the segmentation server 120, the administrative client 160, and the hosts 130. In one embodiment, the network 110 uses standard communications technologies and/or protocols and can include the Internet. In another embodiment, the entities on the network 110 can use custom and/or dedicated data communications technologies. The network 110 includes one or more network midpoint devices 180 that facilitate communications over the network 110. The network midpoint devices 180 may include, for example, routers, switches, access points, firewall devices, or other devices that control communications between the workloads 138 over the network 110.

The administrative client 160 comprises a computing device that may be operated by an administrator of the administrative domain 150 being managed by the segmentation server 120. The administrative client 160 may execute an interface (e.g., via an application or web browser) that enables the administrator to interact with the segmentation server 120 to configure or view a segmentation policy as described below. The interface may furthermore enable the administrator to obtain various information about the hosts 130 and workloads 138 on the network 120 and view or interact with visualizations of traffic flows between workloads 138 as described below.

The segmentation server 120 is a computer (or set of computers) that obtains and stores information about the hosts 130 on the network 110, the network midpoint devices 180, and the workloads 138 executing on the hosts 130. The segmentation server 120 manages a segmentation policy for the administrative domain 150 that regulates communications between workloads 138 within the administrative domain 150. In an embodiment, the segmentation policy is set forth using permissive rules that specify connections that are permitted. The segmentation policy is enforced by blocking connections that are not expressly permitted by the rules. For example, the segmentation policy includes a set of rules specifying whether certain workloads 138 are allowed to provide services to or receive services from other workloads 138, and may place restrictions on how those workloads 138 are allowed to communicate when providing or consuming the services. For example, a segmentation policy may include a rule specifying that a workload 138-1 operating on a host 130-1 is allowed to provide a particular service to a workload 138-2 operating on a host 130-2. Absent other rules, the workload 138-1 will thus be blocked from providing the service to a workload 138-N operating on a host 130-N. The rule may furthermore specify the type of service that the workload 138-1 is allowed to provide to workload 138-2 (e.g., a database service, a web service, etc.). Additionally, the rule may specify how the workloads 138-1, 138-2 may communicate when providing this service (e.g., using encrypted communication only, using authenticated communication only, etc.). A rule may be specified as a plurality of fields including a "service," a "provided-by" portion that identifies one or more workloads 138 that is permitted to provide the service (which may be specified by a port number), a "used-by" portion that identifies one or more workloads 138 that is permitted to use the service provided by the workloads 138 in the "provided-by portion," and a "rule function" that may place one or more restrictions on the communications between the workloads 138 while facilitating the service.

In an embodiment, the segmentation server 120 may assign one or more labels to each workload 138 that define one or more high-level characteristics of the workload 138. Labels may be multi-dimensional. Here, a label may comprise a "dimension" (a high-level characteristic) and a "value" (the value of that high-level characteristic). For example, one possible label dimension may specify a "role" of the workload 138 and may have values such as "web," "API," or "database" specifying the role of the workload 138 within the administrative domain 150. In another example, a label dimension may specify a "location" of the workload 138 and may have values such as "United States" or "Europe." Workloads 138 may also be labeled based on a user group of a user that is logged into the workload 138 or the corresponding host 130 on which the workload 138 executes. For example, a workload 138 may have a label with a dimension "user group" and a value "managers." Workloads 138 may also have labels indicating whether the workload 138 provides a core service or a label indicating a specific core service provided. Each workload 138 may be assigned labels for one or more dimensions but each workload 138 does not necessarily have a label assigned for every possible dimension. For example, a workload 138 may have a label specifying its location but may not necessarily have a label specifying its role. The set of labels assigned to a particular workload 138 may be referred to herein as a label set for the workload 138.

A logical management model specifying the number and types of dimensions available and those dimensions' possible values may be configurable. In one embodiment, the logical management model includes the following dimensions and possible values, as shown in Table 1:

TABLE 1

Example of logical management model

| Dimension | Meaning (M), Values (V) |
| --- | --- |
| Role | M: The role of the workload within the administrative domain.<br>V: web, API, database |
| Environment | M: The lifecycle stage of the workload.<br>V: production, staging, development |
| Application | M: The logical application (higher-level grouping of managed servers) to which the workload belongs.<br>V: trading, human resources |
| Line of Business | M: The business unit to which the workload belongs.<br>V: marketing, engineering |
| Location | M: The location of the workload. Can be physical (e.g., country or geographical region) or logical (e.g., network). Physical is particularly useful for expressing geographic compliance requirements.<br>V: US or EU (physical), us-west-1 or us-east-2 (logical) |
| User Group | M: The user group containing the user logged onto the workload.<br>V: Engineers, Contractors, Managers, System Administrators |

The segmentation server 120 may utilize label sets to enable the segmentation policy to be defined at a high level of abstraction by specifying rules based on label sets. Thus, a rule of the segmentation policy may identify a group of workloads 138 to which a portion of the rule is applicable by referencing one or more label sets. For example, a rule may specify that a first group of workloads 138 with a label set A may provide a service B to a second group of workloads 138 with a label set C. In another example, a rule may specify that all workloads 138 that are core service providers can provide the core services to any other workloads 138. Rules may be specified for groups of workloads 138 identified using only a subset of the label dimensions.

The segmentation server 120 may retain a repository storing information about the hosts 130 and the workloads 138 managed by the segmentation server 120. For example, the segmentation server 120 may store workload identifiers that identify the workloads 138, and membership information indicating one or more groups of workloads 138 to which each workload 138 belong (e.g., as defined by the respective label sets for the workloads 138).

Table 2 illustrates an example of information stored by the segmentation server 120. Here, the workload IDs represent the workload identifiers for the workloads 138. The memberships represent groups to which one or more workloads 138 belongs. Each group may correspond to a unique label set involving one or more dimensions.

TABLE 2

Example of a Repository Table

| Workload ID | Memberships |
|---|---|
| ID1 | A, C, D |
| ID2 | B, C |
|  | D |
| . | . |
| . | . |
| . | . |
| IDn | B, D, E, F |

Instead of enforcing the segmentation policy at a centralized device, the segmentation policy is instead enforced in a distributed manner by at least a subset of the hosts 130 and/or the network midpoint devices 180. To enable enforcement of the segmentation policy, the segmentation server 120 generates a set of management instructions and distributes the management instructions to enforcement modules 132 that may be executed on the hosts 130 or on the network midpoint devices 180. The management instructions include the rules controlling communications between different groups of workloads 138 (e.g., specified by their label sets or directly by an identifier of the workload 138) and membership information indicating workloads 138 belonging to each group (e.g., which workloads 138 have certain label sets). For efficiency of distribution, the segmentation server 120 may send different management instructions to different enforcement modules 132 so that each enforcement module 132 gets only the management instructions relevant to its operation. Here, the segmentation server 120 may determine which rules are relevant to a given enforcement module 132 and distribute the relevant rules to that enforcement module 132. A rule may be deemed relevant to an enforcement module 132 on a particular host 130 if that host 130 executes one or more workloads 138 that belongs to a group (defined by one or more label sets) referenced by the rule and the enforcement module 132 on the host 130 is configured to enforce that particular rule. A rule may be deemed relevant to an enforcement module 132 on a particular network midpoint device 180 if that network midpoint device 180 is upstream from a host 130 executing one or more workloads 138 that belongs to a group (defined by one or more label sets) referenced by the rule and the enforcement module 132 on the network midpoint device 180 is configured to enforce that particular rule. The segmentation server 120 may furthermore determine which membership information is relevant to each enforcement module 132 and distribute the relevant membership information to each respective enforcement module 132. Here, membership information may be relevant to a particular enforcement module 132 if it defines membership of a group referenced by a rule deemed relevant to the particular enforcement module 132.

In an embodiment, the enforcement modules 132 may monitor traffic that is either blocked or allowed to pass through to or from a workload 138. The enforcement modules 132 may log the traffic and/or report the traffic to the segmentation server 120. The segmentation server 120 may receive the reported traffic from the enforcement modules 132 and may generate a visual representation of the connections being allowed and connections being blocked.

Figure 2:
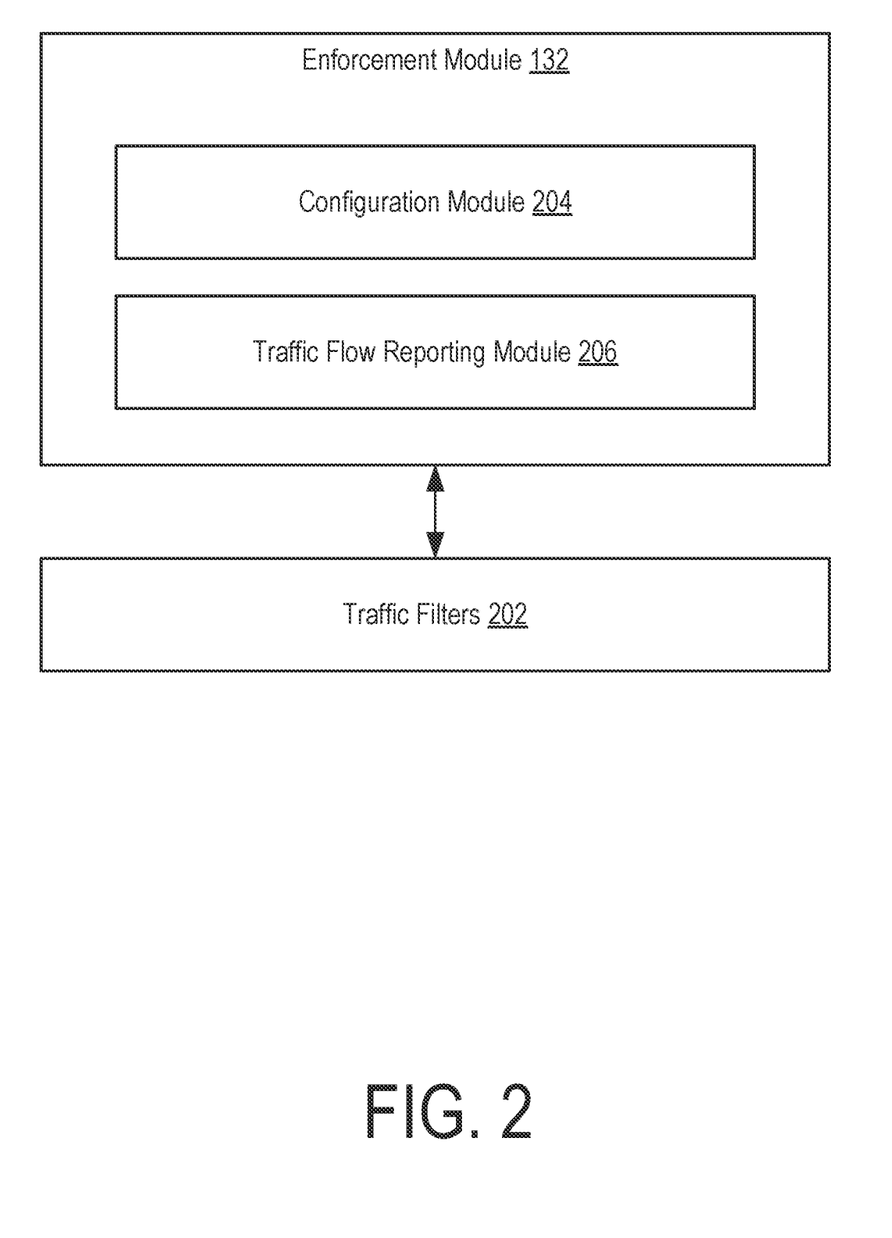
FIG. 2 is a block diagram illustrating an example embodiment of an enforcement module.

FIG. 2 illustrates an example embodiment of an enforcement module 132. The enforcement module 132 comprises a configuration module 204 and a traffic flow reporting module 206 that interact with traffic filters 202. The traffic filters 202 may be co-located with the enforcement module 132 on the host 130 or network midpoint device 180 or on a separate host. In alternative embodiments, the enforcement module 132 may include different or additional modules. The various components of the enforcement module 132 may be implemented as one or more processors and a non-transitory computer-readable storage medium that stores instructions executed by the one or more processors to carry out the functions attributed to the enforcement module 132 described herein.

The traffic filters 202 operates to enforce the segmentation policy with respect to a workload 138 executing on a host 130. In an embodiment, the traffic filters 202 apply a set of packet filtering rules that block or allow communications to a particular destination address based on the source address and specific criteria associated with the communications such as the ports and protocols associated with the communications and a connection state. In an embodiment, the rules applied by the traffic filters 202 are generally permissive rules (e.g., a white list) that specify which specific communications are permitted. A default rule may cause the traffic filters 202 to block communications (e.g., drop packets) that do not match any of the permissive rules. The traffic filters 302 may furthermore monitor and log the results of applying the filtering rules to communications it receives. For example, the traffic filters 202 may log when each time the traffic filters 202 allows a traffic flow or each time it blocks a traffic flow.

In an embodiment, the traffic filters 202 may comprise an operating system-level firewall such as a Linux kernel firewall based on iptables or Netfilter modules or a Windows firewall based on a Windows Filtering Platform. Furthermore, the traffic filters 202 may comprise an Internet Protocol security (IPsec) engine that controls encryption and decryption of packets.

The configuration module 204 receives management instructions from the segmentation server 120 and translates the management instructions from a high level of abstraction to a low level of abstraction to configure the traffic filters 202. For example, for a given rule that permits communication between a workload 138 and a group of other workloads 138 having a specified label set, the traffic filter configuration module 204 determines workload identifiers for each of the workloads 138 having the specified label set, and configures the traffic filters 202 to permit communications with the identified workloads 138 in accordance with any restrictions (e.g., ports and protocols) specified in the given rule.

The traffic reporting module 206 obtains traffic information from the traffic filters 302 (e.g., by accessing the traffic flow logs) and reports traffic flow data to the segmentation server 120.

Figure 3:
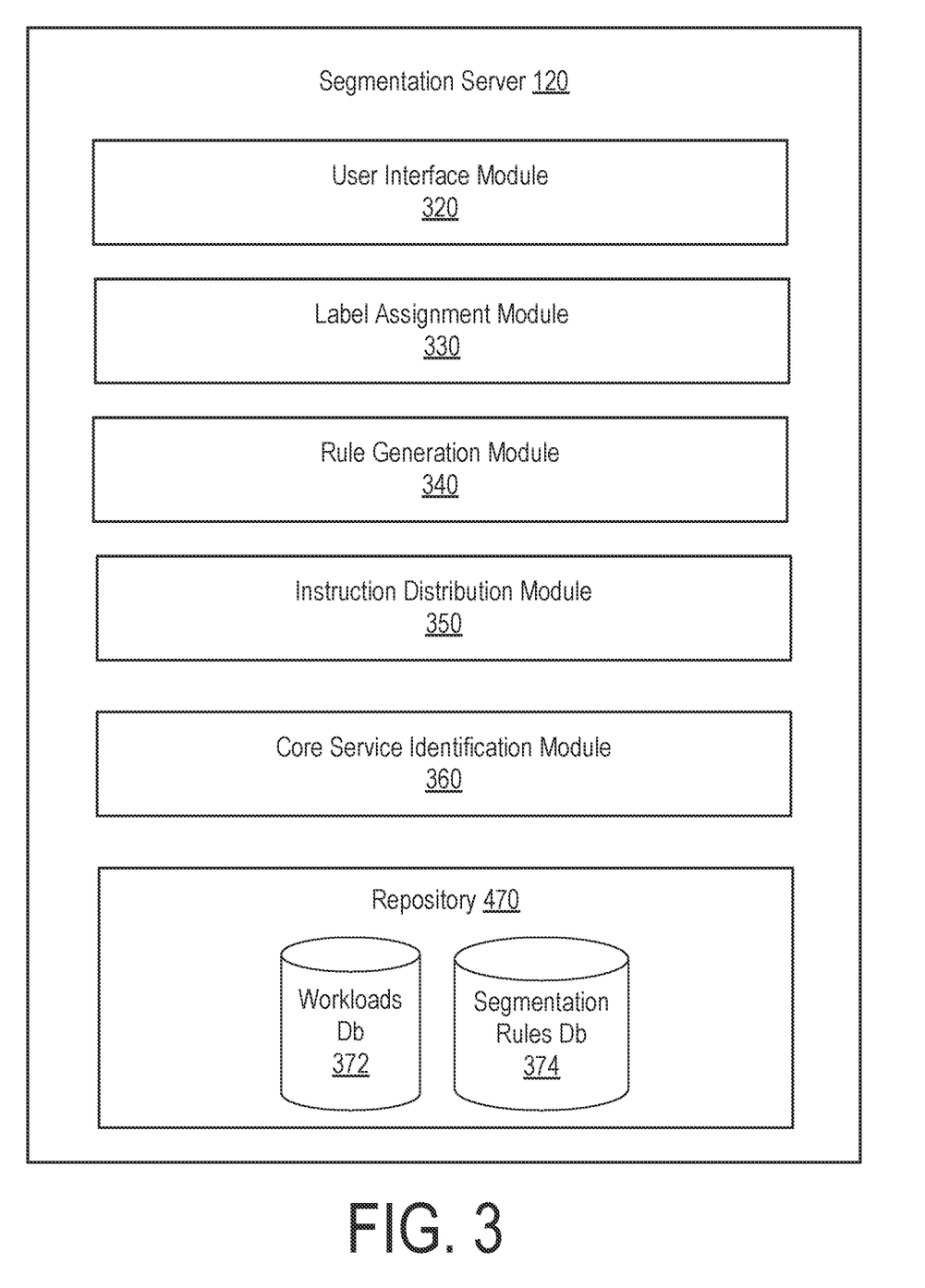
FIG. 3 is a block diagram illustrating an example embodiment of a segmentation server.

FIG. 3 is a high-level block diagram of an embodiment of a segmentation server 120. The segmentation server 120 comprises a user interface module 320, a label assignment module 330, a rule generation module 340, an instruction distribution module 350, a core service identification module 360, and a repository 370. The repository 370 may comprise a workloads database 372 that stores associations between workloads 138 and their respective label sets (including identification of workloads 138 providing core services) and a segmentation rules database 374 that stores a segmentation policy as a set of rules. In alternative embodiments, the segmentation server 120 may include different or additional components. The various components of the segmentation server 120 may be implemented as one or more processors and a non-transitory computer-readable storage medium that stores instructions executed by the one or more processors to carry out the functions attributed to the segmentation server 120 described herein.

The user interface module 320 interfaces with the administrative client 160 to present a user interface enabling an administrator to view and interact with a representation of the traffic flows. For example, the user interface module 320 may present a traffic flow graph that represents workloads 138 or groups of workloads 138 as nodes, and represents connections or blocked connections between the workloads 138 or groups of workloads 138 as edges. The edges may be labeled to indicate whether they represent connections or blocked connections, and whether they represent core services. Optionally, traffic flows representing core services may be hidden from the traffic flow graph.

The label assignment module 330 facilitates assignment of labels to workloads 138. For example, the label assignment module 330 may automatically assign labels based on a set of configurable label assignment rules that may be managed by an administrator via the administrative client 160. Alternatively, labels for individual workloads 138 or groups of workloads 138 may be manually assigned by an administrator. Labels may be updated dynamically based on changing characteristics of workloads 138. In an embodiment, labels may include whether a workload 138 is providing a core service.

The rule generation module 340 automatically generates or updates a segmentation policy comprising a set of rules. The rules may be manually configured by a system administrator or may be generated automatically based on various predefined segmentation strategies. For example, under one segmentation strategy for automatically generating rules, the rule generation module 340 may initially configure enforcement modules 132 to permit all traffic. The rule generation module 340 then obtains traffic flow data to learn the traffic flow patterns under normal operating conditions, and generates rules to permit the traffic flows being observed under the normal operating conditions without permitting traffic flows that are not observed under these conditions. This enables automatic generation of a segmentation policy that will block abnormal connection attempts and reduce the likelihood of malicious activity. In other embodiments, different segmentation strategies may be applied to generate segmentation rules. In an embodiment, the rule generation module 340 may generate rules to automatically allow traffic flows identified as being associated with core services.

The instruction distribution module 350 distributes instructions to the enforcement modules 132 to enable the enforcement modules 132 to enforce the segmentation rules. In an embodiment, the instruction distribution module 350 determines which rules are relevant to different enforcement modules 132 depending on the labels of the workloads 138 associated with each enforcement module 132 and distributes only relevant rules to each enforcement module 132. Thus, different enforcement modules 132 may receive different subsets of the rules depending on which workloads 138 are associated with them. The instruction distribution module 350 may furthermore send updated instructions in response to changes in the rules, changes in the workloads 138 present in the administrative domain 150, changes in the label sets associated with the workloads 138, or other configuration parameters.

The core services identification module 360 identifies traffic flows associated with core services and identifies the workloads 138 providing those core services. Workloads 138 that provide core services may be labeled to enable the segmentation policy to protect these core services. An identification process operates with low rate of false positives and enables identification of core services that utilize ports that are not widely known for a specific service.

In an embodiment, the core services identification module 360 may identify core services using a hybrid approach that may include a port based matching technique and/or one or more classification technique. In this hybrid approach, port based matching is used for services that are comparatively straight forward to classify, for example—DNS, NTP etc. These services are easy to identify because they usually listen on one well-known port or a small number of ports. For services that listen on multiple ports or on non-standard ports, such as Active Directory, Net-Backup, CF-Engine, SCCM etc., a classification-based approach is applied. This approach enables identification of core services that are more complex to identify and may not be accurately captured in the list of rule sets generated by the port based matching.

Figure 4:
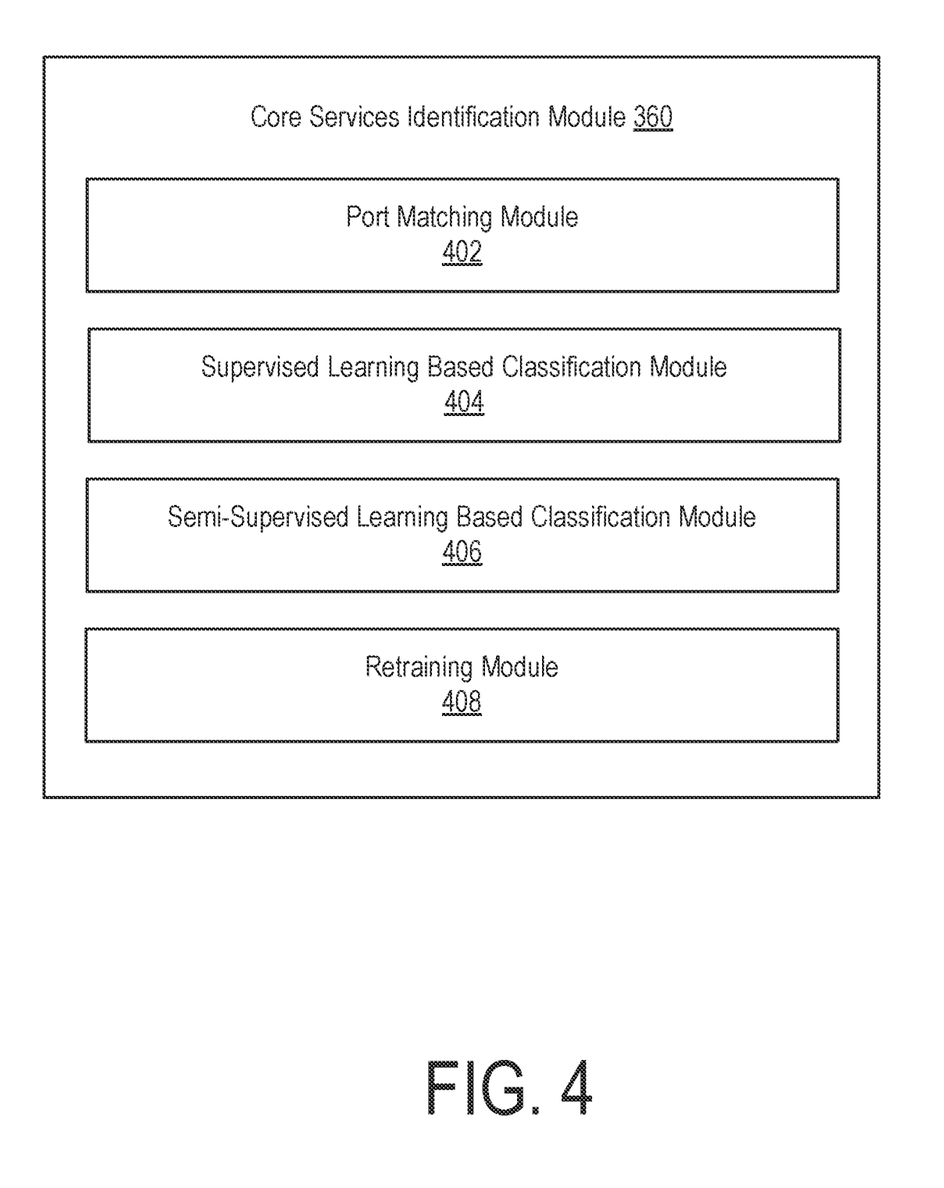
FIG. 4 is a block diagram illustrating an example embodiment of a core services identification module.

FIG. 4 illustrates an example embodiment of a core services identification module 360. The core services identification module 360 includes a port matching module 402, a supervised learning based classification module 404, a semi-supervised learning based classification module 406, and a retraining module 408. In alternative embodiments, one or more of these modules 402, 404, 406, 408 may be omitted and a more limited set of core services identification techniques may be employed.

The port matching module 402 classifies a workloads 138 based on the ports used in connections to other workloads. Specifically, the port matching module 402 stores a list of ports that are commonly used in conjunction with core services and compares the ports of the workload 138 used in making connections against the list.

To reduce or avoid false positives, the port matching module 402 may apply a noise suppression algorithm to filter the detection results. In a first embodiment of a noise suppression algorithm, a preprocessing step is performed to split the observed traffic flow data for a workload 138 into buckets each corresponding to a predefined time period (e.g., one day). The port matching module 402 then checks if there exists a time period where the total number of connections were greater than a predefined threshold (e.g., 10) for any unique combination of connection characteristics (e.g., source, destination, port and protocol), and discards connection data not meeting this criterion. For example, the noise suppression algorithm may be applied as:

if $\exists x$ s.t. $x > T$ keep, else discard where x is the set of total number of connections for each day for a source, destination, port and protocol combination and T is the threshold criterion. The port matching module 402 compares the ports associated with connections meeting the criterion with the list of ports for the set of specific core services. The port matching module 402 identifies the workloads 138 providing the traffic flows on those ports as providers of the respective core services. Here, the list may indicate in a binary fashion whether a port corresponds to a core service, or may specify the type of core service associated with each port.

In a second embodiment of a noise suppression algorithm, traffic relating to background scanners may be identified and suppressed. Scanners that can produce a significant amount of noise may include, for example, vulnerability scanners such as Qualys, Tenable, Rapid7, etc. Additionally, scanner traffic may include nmap scans performed by networking or security administrators to map out hosts and identify systems. In other cases, scanner traffic may include scans performed by malicious actors doing reconnaissance. Scans can include horizontal scans in which the scanner scans a single port (e.g. 80, 443 or 22) across multiple network addresses, and vertical scans in which the scanner scans multiple ports (often 100s or 1000s) of a single network addresses. In other examples, horizontal scans can occur over a small range of ports, and vertical scans can occur over a small range of network addresses.

In this embodiment, the port matching module 402 scans the network flow data and identifies the network addresses of workloads 138 that exhibit any of the above-described scanning behaviors in their flow traffic over a predefined period of time. The port matching module 402 then removes the flow data associated with the source network address exhibiting the scanning behavior. The port matching module 402 matches the ports utilized in the remaining traffic flow data against the ports in the list of ports associated with specific core services. The port matching module 402 identifies the workloads 138 utilizing ports having a match in the list as core service providers. The port matching module 402 may furthermore identify workloads 138 performing the scanning behavior and label these workloads as scanners. The port matching module 402 may then suppress all traffic from the scanner workloads 138 in subsequent iterations of the core service detection.

The supervised learning based classification module 404 applies a classification model to identify workloads 138 providing a core service. The supervised learning based classification module 404 may identify whether the workloads 138 provide a core service in a binary fashion or may identify a specific core service provided by a workload 138 (e.g. Active Directory). The classification module 404 may apply several different models that are each trained to identify different specific core services. To train each model, workloads 138 providing specific core services may be observed to identify one or more characteristics associated with the core service. For example, the characteristics may include one or more of process information corresponding to processes executing on the workloads 138 providing the core services, network flow data, listening ports associated with the processes executing on the workloads 138, operating system type, Windows service names, user account identifiers associated with the executing processes, number of peers communicating with the workload 138, amount of data transferred to or from the workload 138 per connection, or a combination thereof.

In the above list, process information can include, for example, full path names, base names (e.g. java independent of the path it was installed in), process hash data (to identify similar files completely independent of the file name or path, or to identify different processes with the same names), command line arguments (e.g. the script name run by an interpreter), environment variables (e.g. in the case of a java war file passed as environment rather than on the command line), or other process characteristics.

Furthermore, in the above list, network flow data may comprise, for example, 5-tuple information including source network (e.g., IP) address, destination network address, source port, destination port, and protocol. In other embodiments, the network flow data can also include information such as duration of session, timestamp, destination FQDN, correlated source and destination process information, user account identifier, windows service name, or other network flow information.

To train a classification model for identification of a specific core service, a training set of workloads 138 is identified that includes workloads 138 providing the core service and workloads 138 not providing the core service. For a set of observed connections of the workloads 138, characteristics associated with the training set of workloads 138 receiving connection requests and the source workloads 138 making those connection requests are observed and logged in a sample dataset. For example, using listening process information as the observed characteristic, the following example data may be logged for a set of workloads 138 including Workload_1 and Workload_3 that each provide a core service and Workload_2 that does not provide the core service as illustrated in Table 3:

TABLE 3

| workload_uuid | listening_process_name |
|---|---|
| Workload_1 (Core service) | Process_1 |
| Workload_1 (Core service) | Process_2 |
| Workload_2 (non-core service) | Process_2 |
| Workload_2 (non-core service) | Process_3 |
| Workload_3 (core service) | Process_1 |

Then the above derived sample dataset (workloads 138 and their characteristics) is encoded (e.g., using a one-hot encoding scheme) with one or more of the characteristics listed above acting as a feature set. For example, the above example data set of Table 3 may be encoded as a set of feature vectors, where each feature vector corresponds to a different workload 138 and each element of the feature vector indicates whether a different specific characteristic (e.g., process) is observed on that workload 138 as illustrated in Table 4:

TABLE 4

| | | Feature Vector | | |
|---|---|---|---|---|
| workload_uuid | Label | Process_1 | Process_2 | Process_3 |
| Workload_1 | 1 | 1 | 1 | 0 |
| Workload_2 | 0 | 0 | 1 | 1 |
| Workload_3 | 1 | 1 | 0 | 0 |

In Table 4, the label value represents whether the workload 138 provides the core service (e.g., a "0" indicates that the workload 138 does not provide the core service, and a "1" indicates that the workload 138 provides the core service). The values for each process similarly indicate whether the workload 138 utilizes that listening process name (e.g., a "0" indicates that the workload 138 does not utilize that listening process name and a "1" indicates that the workload 138 utilizes the listening process name). Thus, Table 4 maps the features vector 110 to 1, maps the feature vector 011 to 0, and maps the feature vector 100 to 1.

While Tables 3 and 4 represent a simplified example, embodiments of the training process may utilize additional or different characteristics (or combinations thereof) to generate the feature vectors. Furthermore, in alternative embodiments, the elements of each feature vector do not necessarily represent binary indicators and may instead represent a specific value associated with a characteristic of a workload 138 such as, for example, a connection count, a peer count, a byte count, etc. For example, a feature vector may be generated based on port information in which each element of the feature vector for a workload 138 corresponds to a different port number and represents a unique peer count of connections to that port. Here, a feature vector may be associated with a label that generally indicates whether the workload 138 provides any core service, or the feature vector may be associated with a label that indicates whether the workload 138 provides a specific core service. In the latter case, multiple feature vectors may be generated for a workload 138 each indicating whether the workload 138 provides a different core service. Feature vectors relating to different core services may represent different sets of characteristics that are useful for detecting the associated core service. In an embodiment, the classification module 404 may store a feature vector matrix comprising a set of feature vectors for each workload 138 that each relate to a different core service and/or a different set of characteristics. In an embodiment, the feature matrix may be transformed into a TF-IDF weighting matrix to avoid the impact of noisy ports and processes.

A set of one or more binary classification models such as a logistic regression may then be learned to represent the mappings between the feature vectors and their labels. Multiple models may be learned that each correspond to a different core service sought to be identified. In another embodiment, a non-binary classification model such as a support vector machine (SVM) model or K-nearest neighbors model may be learned to perform multi-class classification, where each class corresponds to a different core service.

The classification module 404 generates similar feature vectors for a set of target workloads 138 with unknown labels and applies the one or more learned models to classify each of the workloads 138 as a core service provider (generally, or with respective to a specific core service) or non-core service provider. The output of the classification model may comprise a confidence value (e.g., between 0 and 1) for each workload 138 indicating the likelihood of the workload 138 providing the core service associated with the model. The classification module 404 may generate a final classification by comparing the confidence value to a predefined threshold (e.g., 0.5). If multiple classification models are learned for different types of core services, the set of models may be separately applied to generate multiple confidence values for each workload, each corresponding to a different type of core service.

In the above described process, the classification module 404 may obtain characteristics of the workloads 138 directly from the workloads 138 or from enforcement modules 132 associated with the workloads 138. In other cases, the classification module 404 may indirectly derive the characteristics. For example, for "managed" workloads 138 that are controlled by an enforcement module 132, the enforcement module 132 may obtain the relevant characteristics and provide them to the classification module 404 for use in the feature vectors. Alternatively, a different agent (not necessarily the enforcement module 132) may perform this function. In other cases, a workload 138 may be "unmanaged" and the classification module 404 does not have direct access to the relevant characteristics (e.g., because the workload 132 does not have an enforcement module 132 or other agent configured to provide this information). Characteristics associated with unmanaged workloads 138 may be obtained from peer workloads (that are managed) connected to the unmanaged workloads 138. For example, for inbound core services in which connection requests are made to an unmanaged workload 138 providing the inbound core service, certain relevant characteristics (e.g., the source process information and source account information) can instead be obtained from peer workloads 138 that are managed and make connections to the unmanaged workload 138. For outbound core services in which connection requests are initiated by an unmanaged workload 138 providing the outbound core service, the certain relevant characteristics (such as process and user information) can be obtained from the peer destination workloads 138 receiving those connections. In an embodiment, multiple classification models may be learned and applied that separately map characteristics associated with unmanaged workloads 138 receiving inbound connections and characteristics associated with unmanaged workloads 138 making outbound connections.

In some cases, the classification module 404 can obtain only certain relevant characteristics for a particular workload 138 but cannot necessarily obtain all of the characteristics that may be useful to classify the workload 138. Here, the classification module 404 may establish multiple models that are applied in an order of preference depending on which characteristics are available. For example, in one embodiment, the classification module 404 may classify workloads 138 based on process information when the process information is available. If the process information is not available for a workload 138 (e.g., because the workload 138 is unmanaged), the classification module 404 instead generates feature vectors based on the port numbers used by the workload 138 since this can typically be obtained from peer workloads 138.

The semi-supervised learning based classification module 406 applies a semi-supervised learning based classification model to identify workloads 138 providing a core service. In this technique, the classification module 406 operates as an "oracle" to generate a workload 138 that provides a core service and gives characteristics such as labels, listening processes and ports, connection and peer count, or other characteristics. The classification module 406 applies a clustering algorithm to identify a cluster of similar workloads 138 having similar characteristics to the workload 138 generated by the oracle. The classification module 406 then classifies workloads 138 in the same cluster as providing the same core service.

To perform clustering, one or more data transformation techniques may be applied to observed characteristics such as TF-IDF weighting, normalization, min max scaling, Z score, logarithm transformation, square transformation, or robust scaler. Clustering may be performed on the transformed data using a similarity algorithm that generates a similarity metric such as, for example, Jaccard similarity, cosine similarity, Pearson similarity, Euclidean distance, or overlap similarity. The clustering process may be repeated for a set of workloads to identify clusters for different core services.

In an embodiment, following initial classification of workloads 138 as core service workloads or non-core service workloads, a retraining module 408 may output results to the administrative client 160 to enable an administrator to review the classification and either attest to the classification or change the classification. In an example embodiment, a user interface provides an attest page listing a set of workloads 138 and confidence scores representing a likelihood of the workload 138 providing the core service according to the classification model. On this interface, the administrator may choose to attest to or dispute the classification by selecting yes or no, or the administrator may choose to skip making a determination for a particular workload. For example, a checkbox selector may be utilized to label multiple workloads and an option may be available to label the workloads with automatically generated recommended labels. In an embodiment, the user interface enables the administrator to add customized labels or edit previously applied labels. Furthermore, the user interface indicates the workloads with newly changed labels, in which the old labels are crossed out and the new labels are attached. After the administrator reviews changes, the administrator may select an option to store the changes.

The retraining module 408 may perform retraining of the models based on the saved inputs. For example, in one embodiment, the retraining module 408 may retrain learned models based on any new labels changed by the administrator to correct for false positives. This enables the model to learn the real characteristic of the misclassifications and identify them more accurately in the future.

In another embodiment, the features used in the feature vectors may be modified depending on false positives identified by an administrator. For example, the false positives generated by the model may be analyzed to learn confusing or missing features in the model. After analyzing the false positives, further feature engineering may be performed to improve the model.

In another embodiment, a scaling technique may be applied to determine if certain values (e.g., unique peer count or total number of connections) correlate to the false positives produced by the model. The retraining module 408 may apply scaling techniques such as normalization, min max scaling, logarithmic transformation, square transformation, robust scaling, TF-IDF weighting, or other scaling techniques to the training dataset to counteract these false positives. The retraining module 408 further trains the models based on this new training dataset to generate the results with better accuracy.

Figure 5:
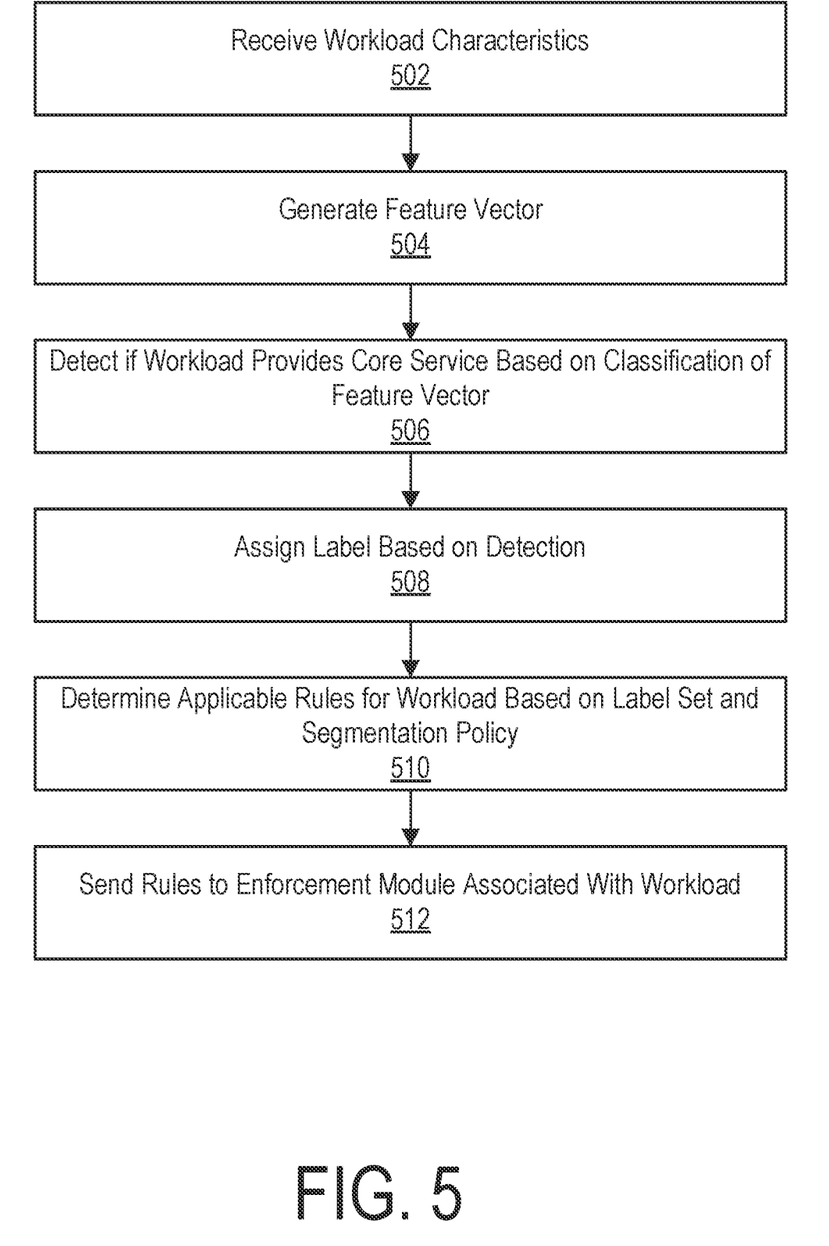
FIG. 5 is a flowchart illustrating an example embodiment of a process for updating enforcement of a segmentation policy based on core services detection.

FIG. 5 illustrates an example embodiment of a process for updating enforcement of a segmentation policy based on detection of core services. A segmentation server 120 receives 502 a set of workload characteristics associated with a workload 138 executing on a host 130. The segmentation server 120 generates 504, based on the set of workload characteristics, a feature vector representing the set of workload characteristics. The segmentation server 120 detects 506 whether the workload 138 provides a core service. Here, the detection may be based on port matching, a supervised learning based classification model, an semi-supervised learning based classification model, or a combination thereof. In an embodiment, these techniques may be applied in parallel and the workload 138 is classified as providing a core service when any one of the techniques detects the core service. Alternatively, one or more of the techniques may be applied contingently on a core service not being detected using one or more other techniques. For example, in an embodiment, a port matching technique may first be applied. If the port matching technique does not detect a core service, then one of the classification techniques may be applied. If a core service is still not detected, another classification technique may be applied.

Responsive to detecting that the workload 138 provides the core service, the segmentation server 120 assigns 508 a label to the workload 138 indicative of the workload 138 providing the core service. The label may be applied automatically, or responsive to an administrator attesting to the classification. The segmentation server 120 determines 510 based on the segmentation policy and the label set for the workload (which includes the label indicative of the workload 138 providing the core service), segmentation rules that are applicable to the workload 138 and sends 512 the applicable rules to an enforcement module 132 associated with the workload 138 to enable enforcement of the rules.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the claims.

What is claimed is:

1. A method for detecting workloads that provide core services in a network, the method comprising:
   receiving a set of workload characteristics associated with a workload;
   detecting, based on the set of workload characteristics, whether the workload provides a core service; and
   responsive to detecting that the workload provides the core service, assigning a label to the workload indicative of the workload providing the core service.

2. The method of claim 1, further comprising:
   determining, based on a segmentation policy, a set of segmentation rules applicable to the workload based on the label indicative of the workload providing the core service; and sending the set of segmentation rules to an enforcement module associated with a host device on which the workload is executing, the set of segmentation rules enabling the enforcement module to enforce the set of segmentation rules applicable to the workload.

3. The method of claim 1, wherein detecting whether the workload provide the core service comprises:
generating, based on the set of workload characteristics, a feature vector representing the set of characteristics; and
applying a classification model to the feature vector to determine a class of the workload, the class indicating whether the workload provides the core service.

4. The method of claim 3, wherein the classification model is a semi-supervised learning-based classification model, and applying the classification model comprises:
applying a clustering algorithm to map the feature vector to a cluster of a set of clusters of workloads, wherein at least one of the workloads in the cluster is verified as being a core service provider; and
classifying the workload based on the clustering algorithm.

5. The method of claim 3, wherein generating the feature vector comprises:
generating the feature vector to encode process information associated with processes executed by the workload.

6. The method of claim 3, wherein generating the feature vector comprises:
determining that process information associated with processes executed by the workload is not available for the workload; and
responsive to determining that the process information is not available, generating the feature vector based on port information of the workload.

7. The method of claim 3, wherein the feature vector comprises a sequence of values in which each of the values comprises a binary representation of whether the workload exhibits one of the set of characteristics.

8. The method of claim 1, wherein detecting whether the workload provides the core service comprises:
performing a comparison of a set of operating ports of the workload to a list of ports associated with a set of core services; and
detecting that the workload provides the core service responsive to the set operating ports having a match in the list of ports.

9. The method of claim 8, wherein performing the comparison of the set of operating ports of the workload to a list of ports associated with a set of core services comprises:
detecting ports of the workload that are associated with connections meeting criteria of occurring at least a predefined number of times within a predefined time window,
wherein the set of operating ports using in the comparison include only the ports associated with the connections meeting the criteria.

10. The method of claim 8, wherein performing the comparison of the set of operating ports of the workload to a list of ports associated with a set of core services comprises:
detecting ports of the workload exhibiting port scanning behavior,
wherein the set of operating ports using in the comparison exclude the ports exhibiting the port scanning behavior.

11. A non-transitory computer-readable medium storing instructions for detecting workloads that provide core services in a network, the instructions, when executed by a computing system, causing the computing system to perform operations comprising:
receiving a set of workload characteristics associated with a workload;
detecting, based on the set of workload characteristics, whether the workload provides a core service; and
responsive to detecting that the workload provides the core service, assigning a label to the workload indicative of the workload providing the core service.

12. The non-transitory computer-readable medium of claim 11, wherein the operations further comprise:
determining, based on a segmentation policy, a set of segmentation rules applicable to the workload based on the label indicative of the workload providing the core service; and
sending the set of segmentation rules to an enforcement module associated with a host device on which the workload is executing, the set of segmentation rules enabling the enforcement module to enforce the set of segmentation rules applicable to the workload.

13. The non-transitory computer-readable medium of claim 11, wherein detecting whether the workload provide the core service comprises:
generating, based on the set of workload characteristics, a feature vector representing the set of characteristics; and
applying a classification model to the feature vector to determine a class of the workload, the class indicating whether the workload provides the core service.

14. The non-transitory computer-readable medium of claim 13, wherein the classification model is a semi-supervised learning-based classification model, and applying the classification model comprises:
applying a clustering algorithm to map the feature vector to a cluster of a set of clusters of workloads, wherein at least one of the workloads in the cluster is verified as being a core service provider; and
classifying the workload based on the clustering algorithm.

15. The non-transitory computer-readable medium of claim 13, wherein generating the feature vector comprises:
generating the feature vector to encode process information associated with processes executed by the workload.

16. The non-transitory computer-readable medium of claim 13, wherein generating the feature vector comprises:
determining that process information associated with processes executed by the workload is not available for the workload; and
responsive to determining that the process information is not available, generating the feature vector based on port information of the workload.

17. The non-transitory computer-readable medium of claim 13, wherein the feature vector comprises a sequence of values in which each of the values comprises a binary representation of whether the workload exhibits one of the set of characteristics.

18. The non-transitory computer-readable medium of claim 11, wherein detecting whether the workload provides the core service comprises:
performing a comparison of a set of operating ports of the workload to a list of ports associated with a set of core services; and
detecting that the workload provides the core service responsive to the set operating ports having a match in the list of ports.

19. The non-transitory computer-readable medium of claim 18, wherein performing the comparison of the set of operating ports of the workload to a list of ports associated with a set of core services comprises:
- detecting ports of the workload that are associated with connections meeting criteria of occurring at least a predefined number of times within a predefined time window,
- wherein the set of operating ports using in the comparison include only the ports associated with the connections meeting the criteria.

20. The non-transitory computer-readable medium of claim 18, wherein performing the comparison of the set of operating ports of the workload to a list of ports associated with a set of core services comprises:
- detecting ports of the workload exhibiting port scanning behavior,
- wherein the set of operating ports using in the comparison exclude the ports exhibiting the port scanning behavior.

* * * * *